US006284720B1

(12) United States Patent
Opre

(10) Patent No.: US 6,284,720 B1
(45) Date of Patent: *Sep. 4, 2001

(54) ENVIRONMENTALLY FRIENDLY INK CLEANING PREPARATION

(75) Inventor: James E. Opre, Downers Grove, IL (US)

(73) Assignee: Vertec Biosolvents, LLC, Mt. Prospect, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,756

(22) Filed: Apr. 4, 2000

Related U.S. Application Data

(63) Continuation-in-part of application No. 09/389,575, filed on Sep. 3, 1999, now Pat. No. 6,096,699.
(51) Int. Cl.[7] .............................. C11D 7/26; C11D 7/50; B08B 7/00
(52) U.S. Cl. .................... 510/170; 510/174; 510/432; 510/437; 510/488; 510/491; 134/42
(58) Field of Search ................................. 510/170, 174, 510/437, 432, 488, 491; 134/42

(56) References Cited

U.S. PATENT DOCUMENTS

| 5,340,595 | | 8/1994 | Mulcahey et al. ................ 134/42 |
| 5,437,808 | * | 8/1995 | Weltman et al. ................. 510/174 |
| 5,567,427 | | 10/1996 | Papadakis et al. ............... 424/401 |
| 5,587,154 | | 12/1996 | Dowell et al. ................. 424/70.11 |
| 5,801,135 | * | 9/1998 | Miyauchi et al. ................ 510/474 |
| 5,861,364 | * | 1/1999 | Beeks et al. ..................... 510/174 |
| 5,964,007 | | 10/1999 | Wisniewski et al. ........... 15/256.53 |
| 6,035,483 | | 3/2000 | Gasparrini et al. ............. 15/256.1 |
| 6,096,699 | * | 8/2000 | Bergemann et al. ............. 510/201 |

* cited by examiner

Primary Examiner—Lorna M. Douyon
(74) Attorney, Agent, or Firm—Welsh & Katz, Ltd.

(57) ABSTRACT

A solvent that is biodegradable, provides effective solvency for a broad range of tasks and is generally benign to human health is disclosed. This solvent is a mixture of a lactate ester and an edible oil ester that has a closed cup flash point at or above 59° C., and can include other non-halogenated solvents and surfactants.

19 Claims, No Drawings

ENVIRONMENTALLY FRIENDLY INK CLEANING PREPARATION

This is a continuation-in-part of application Ser. No. 09/389,575 filed on Sep. 3, 1999, now U.S. Pat. No. 6,096,699.

DESCRIPTION

1. Technical Field

The present invention relates to a cleaning preparation that is biodegradable and generally benign to human health, and more particularly to a mixture of a lactate ester and an ester of a fatty acid derived from an edible oil; the mixture provides effective solvency for a broad range of tasks. This blended solvent is shown to provide effective performance for de-inking and as a general surface cleaning agent that provides for a non-toxic, cost effective alternative to commonly used toxic solvents.

2. Background Art

The printing industry is one of the largest manufacturing industries in the U.S. The industry also generates a large amount of petrochemical waste, much in the form of volatile organic compounds, which are linked to ground-level ozone formation that is associated with smog and other health hazards.

The Environmental Protection Agency reported that the top ten polluting petrochemicals used in the printing industry are (in decreasing order of millions of pounds) toluene, methyl ethyl ketone, glycol ethers, xylene (mixed isomers), tetrachloroethylene, methyl isobutyl ketone, methanol, 1,1,1-trichloroethane, dichloromethane and ethylene glycol. The top four make up the largest amount of the total by far, with toluene making up 75 percent of the total. The solvents are used for cleaning the presses, rollers and other equipment, but also as components of the ink formulations. Many of the petrochemical compositions for cleaning ink contain aromatic groups that do not biodegrade well, and such compositions are undesirable from an environmental standpoint.

A solvent is a substance that is generally capable of dissolving another substance, or solute, to form a uniformly dispersed mixture (solution) at the molecular or ionic level. Solvents are either polar (high dielectric constant) or non-polar (low dielectric constant). Water, the most common solvent, is strongly polar having a dielectric constant of 81. Hydrocarbon solvents are non-polar and are comprised of two groups, aliphatics such as alkanes and alcohols, and aromatics, which generally have a higher solvency power than aliphatics. Other organic solvent groups are esters, ethers, ketones, amines, nitrated hydrocarbons and halogenated hydrocarbons.

The chief uses of organic solvents include dissolution of coatings (paints, varnishes, and laquers), industrial and household cleaners, printing inks, and extractive processes. Because many solvents are flammable and toxic to health, there is a need to develop safer solvents for commercial use without sacrificing critical performance.

U.S. Pat. No. 5,964,007 discloses the use of aliphatic ketone (methyl ethyl ketone preferred, methyl ketone, ethyl ketone, propyl ketone and butyl ketone) and alkylene halide (methylene chloride preferred, ethylene chloride and propylene chloride) solvents for cleaning contact cleaner rolls.

U.S. Pat. No. 6,035,483 discloses the use of a highly viscous cleaning agent to clean cylinders of printing presses.

For decades industrial and household cleaning products have been utilized to provide certain tasks such as paint removers, ink removers, degreasers, etc. Solvents are also used to clean, maintain, and prepare wood, metal, masonry, natural and synthetic fabrics, plastic components, electronic components. Although providing the needs of these many and mission-critical tasks, most solvents generally, are toxic, thus posing a threat to health and to the environment. These environmental and health threats include ozone depleting air pollutants and water pollution that threaten aquatic organisms and drinking water supplies. Many of these solvents are carcinogenic and hazardous to health in general.

Although government, industry and the community at large are all relatively well informed to the dangers of toxic solvents, the dangers associated with the use of such solvents have not dramatically diminished their use. Safer handling, disposal, recycling, recovery and other responsible methods of dealing with toxic substances are improving. However, the availability of safer alternative solvents is still not wide spread, especially in second and third world countries, which is due, primarily, to the high cost of the solvent alternatives and because the majority of the environmentally safer solvent alternatives do not provide satisfactory performance.

In order for an "environmentally friendly" solvent alternative to gain wide spread acceptance, a solvent should meet several criteria. First, it should provide effective performance. Second, it should be economically viable and affordable. Third, it should be widely available and, of course, it should be non-toxic to the environment generally and humans specifically.

Several alternative solvents have been introduced by industry for decades, but in general do not meet the criteria stated above. Further, many of these solvents are not completely biodegradable, just less toxic.

A solvent described hereinafter provides high solvency performance while overcoming the toxicity issues associated with most other organic solvents. In addition, a contemplated solvent is biodegradable.

BRIEF SUMMARY OF THE INVENTION

The present invention contemplates an environmentally friendly ink removal solvent. This solvent is biodegradable in normal sewerage treatment plants, and has a low volatile content so that it can be used indoors with minimal ventilation.

The invention contemplates a composition comprising about 40 to about 70 weight percent of a $C_1$–$C_4$ ester of lactic acid and about 1 to about 30 weight percent $C_1$–$C_4$ ester of a $C_{16}$–$C_{20}$ fatty acid having a melting point of $-10°$ C. or less. In one embodiment of the invention, the composition also comprises about 10 to about 30 weight percent of an organic co-solvent; about 10 to about 30 weight percent of a surfactant; zero to about 5 weight percent of an acidulent; zero to about 10 weight percent of an emulsifying agent; and zero to about 5 weight percent of a fragrance.

In each of the embodiments of the invention, the particularly preferred $C_1$–$C_4$ ester of lactic acid is the ethyl ester so that ethyl lactate is particularly preferred. The particularly preferred $C_1$–$C_4$ ester of a $C_{16}$–$C_{20}$ fatty acid is an ester of a mixture of oleic and linoleic acids. The methyl ester of a fatty acid is preferred; and the fatty acid mixture is preferably derived from an edible oil, with methyl soyate being particularly preferred.

Preferably, the organic co-solvent is a $C_1$–$C_4$ ester of a $C_3$–$C_{10}$ dicarboxylic acid. Preferably, the acidulent is citric acid. A preferred emulsifying agent is a $C_{12}$–$C_{20}$ fatty acid mono- or di-glyceride or a mixture of mono- or di-glycerides.

The invention contemplates a method of removing ink that can be used for cleaning printing presses, blankets and rollers. A method of removing ink according to the invention comprising the steps of providing an ink removal solution, contacting a surface that has ink on it with the ink removal solution, and separating the used ink removal solution from the cleaned surface.

The ink removal solution comprises about 40 to about 70 weight percent of a $C_1$–$C_4$ ester of lactic acid and about 1 to about 30 weight percent $C_1$–$C_4$ ester of a $C_{16}$–$C_{20}$ fatty acid having a melting point of –10° C. or less, as discussed above.

The contact with the ink removal solution is for a period of time sufficient to permit at least some of the ink to become dissolved or dispersed in the ink removal solution to form a used ink removal solution and a cleaned surface. That contact can be with a flushing motion, so that the contact and removal steps might occur at about the same time. That contact could also be with a rubbing motion, providing some friction to assist in ink removal.

The present invention has several benefits and advantages.

One benefit of the invention is that a contemplated composition is safer that halogenated organic solvent.

A related advantage is that a contemplated composition can be used in occupied areas. The characteristic odor from traditional ink removing solvents makes them unsafe to use indoors.

Another benefit of the invention is that ink can be removed from rollers and metal components without corrosion.

An additional advantage of the present invention is that it dries without leaving a film.

A further benefit of the present invention is that the cleaning solvent is miscible with water, and thus can be removed with high pressure water.

A further advantage in the cleaning of air dry inks and paints is that a contemplated composition cleaned tougher grade inks and often cleaned dried inks and paints.

Yet another benefit of the invention is that it is biodegradable, non-toxic and is derived from two major crops, corn and soybeans.

Still another advantage of the invention is that the quantity of ink-removing compositions required to effectively clean ink is less than is needed with the corresponding petroleum-based products.

Still further benefits and advantages will be apparent to the skilled worker from the discussion that follows.

DETAILED DESCRIPTION OF THE INVENTION

The present invention contemplates an alternative solvent that is useful for ink removal applications. Separately, lactate ester based solvents, wholly or in combination with other co-solvents, surfactants, pH adjusters and fragrance have been made. In addition, $C_1$–$C_4$ esters derived from edible oils such as soy, coconut oil, palm kernel oil, neem, peanut, poppy and other mono- and polyunsaturated fatty acid-containing oils (e.g. oleic and linoleic acids) have been developed for certain solvent and cleaning applications. Both lactate esters and edible oil-derived ester solvents have shown to be successful for many application tasks, but separately do not fulfill all properties desired in a solvent and/or cleaning product.

A contemplated composition broadly comprises a solvent blend of about 40 to about 70 weight percent of a $C_1$–$C_4$ ester of lactic acid, preferably about 50 to about 60 weight percent and about 1 to about 30 weight percent, preferably about 2 to about 10 weight percent, of a $C_1$–$C_4$ ester of a $C_{16}$–$C_{20}$ fatty acid having a melting point of –10° C. or less. This blended solvent provides several key beneficial properties not achieved separately.

More specifically, a contemplated composition comprises
(A) about 40 to about 70 weight percent of a $C_1$–$C_4$ ester of lactic acid;
(B) about 1 to about 30 weight percent $C_1$–$C_4$ ester of a $C_{16}$–$C_{20}$ fatty acid having a melting point of –10° C. or less;
(C) about 10 to about 30 weight percent of an organic co-solvent;
(D) about 10 to about 30 weight percent of a surfactant;
(E) zero to about 5 weight percent of an acidulent;
(F) zero to about 10 weight percent of an emulsifying agent; and
(G) zero to about 5 weight percent of a fragrance.

Typically, the composition is a homogeneous solution and has a closed cup flash point greater than 60° C. (140° F.).

A contemplated composition is substantially free of halogenated compounds so that only contaminating amounts of such materials are present.

The $C_1$–$C_4$ ester of lactic acid is preferably an ethyl ($C_2$) ester, ethyl lactate.

Exemplary $C_1$–$C_4$ alcohols that can comprise the $C_1$–$C_4$ ester portion of a lactate ester or of a $C_{16}$–$C_{20}$ fatty acid ester include methanol, ethanol, propanol, isopropanol, allyl alcohol, butanol, 3-buten-1-ol, t-butanol and sec-butanol. The ethyl lactate, on its own, has very strong dissolution power, and it is the primary component of a composition of the invention.

In some contemplated embodiments, the $C_1$–$C_4$ ester of lactic acid is present at about 50 to about 60 weight percent and the $C_1$–$C_4$ ester of a $C_{16}$–$C_{20}$ fatty acid is present at about 2 to about 10 weight percent.

A contemplated $C_1$–$C_4$ ester of a $C_{16}$–$C_{20}$ fatty acid having a melting point of –10° C. or less is an ester of a fatty acid derived (hydrolyzed) from a so-called "edible" vegetable oil. Vegetable oils are comprised of fatty acid triglyceride esters. Hydrolysis of the vegetable oil esters frees the fatty acids, from which the $C_1$–$C_4$ esters are made. Preferred edible vegetable oils including, without limitation, corn, mustard, niger-seed, olive, peanut, poppy-seed, safflower, rape-seed, sesame, soybean, sunflower-seed and wheat-germ oil. The $C_{16}$–$C_{20}$ fatty acid is preferably comprised of a mixture whose fatty acids are constituted by about 70 to about 90 percent unsaturated fatty acids such as oleic, linoleic, erucic and linolenic acids. Fatty acid esters derived from edible vegetable oils containing a mixture of about 70 to about 90 weight percent oleic and linoleic acids are more preferred. Soybean oil hydrolysis results in a fatty acid mixture that is comprised principally of oleic and linoleic acids, and is the source of the preferred $C_{16}$–$C_{20}$ fatty acid. A methyl ($C_1$) ester is the preferred $C_1$–$C_4$ group. A particularly preferred contemplated $C_1$–$C_4$ ester of a $C_{16}$–$C_{20}$ fatty acid is methyl soyate.

A contemplated composition can also contain about 10 to about 30 weight percent of an organic co-solvent. A contemplated organic co-solvent is biodegradable. Exemplary organic co-solvents include esters, alcohols, alkylene carbonates and ethers. Illustrative organic co-solvents include mixed methyl esters of $C_4$–$C_6$ dibasic acids, tetrahydrofurfuryl alcohol and di-$C_2$–$C_3$ alkylene glycol mono and di-$C_1$–$C_6$ alkyl ethers such as dipropylene glycol n-butyl ether (DPNB), dipropylene glycol methyl ether, diethylene glycol t-butyl methyl ether and diethylene glycol butyl ether. Preferably, the organic co-solvent is a $C_1$–$C_4$ ester of a $C_3$–$C_{10}$ dicarboxylic acid, as discussed below. A contemplated organic co-solvent is free of halogens. The organic co-solvent plays a role as a useful bridging solvent, helping to maintain a homogeneous solution and helping to dissolve assorted components.

Mixed methyl esters of $C_4$–$C_6$ dibasic acids are commercially available from DuPont Nylon Intermediates and Specialties, Wilmington, Del. under the designation DBE. Seven DBE fractions are available that differ in the amounts of each of three diesters (dimethyl adipate, dimethyl glutarate and dimethyl succinate) present. Each of the products examined was useful, with the material sold as DBE-3 being preferred. That material is said by its manufacturer to contain 89 weight percent dimethyl adipate, 10 weight percent dimethyl glutarate and 0.2 weight percent dimethyl succinate.

A contemplated composition can also contain about 10 to about 30 weight percent of a surfactant. Surfactants are named herein following the nomenclature system of the *International Cosmetic Ingredient Dictionary*, 5$^{th}$ ed., J. A. Wenninger et al. eds., The Cosmetic, Toiletry, and Fragrance Associaton, Washinton, D.C. (1993), usually followed by a chemical name and a trademark name of a particular product. Exemplary surfactants are isotridecyl alcohol triethoxalate (Surfonic® TDA-3B, Huntsman Corp.), $C_9$–$C_{11}$ pareth-6 [polyethylene glycol ether of mixed synthetic $C_9$–$C_{11}$ fatty alcohols having an average of 6 moles of ethoxylate; Neodol® 91.6], $C_{11}$–$C_{15}$ pareth-59 [polyethylene glycol ether of mixed synthetic $C_{11}C_{15}$ fatty alcohols having an average of 59 moles of ethoxylate; Tergitol® 15-S-59], nonoxynol-6 [polyethylene glycol (6) nonylphenyl ether; Tergitol® NP-6], nonoxynol-9 [polyethylene glycol (9) nonylphenyl ether; Tergitol® NP-9], a modified alkanolamide alkanolamine [Monamine® 1255]. Surfactants containing aromatic groups, such as nonylphenyl groups, are less preferred because they are not as biodegradable as the others. Preferred surfactants are and branched and linear alcohol ethoxylates. Most preferred surfactants are alcohol ethoxylates. The addition of a surfactant to a composition comprising a $C_1$–$C_4$ ester of lactic acid and a $C_1$–$C_4$ ester of a $C_{16}$–$C_{20}$ fatty acid is preferred. The addition of a surfactant typically makes the cleaner more effective.

The invention further contemplates a composition comprising an acidulent. The acidulent is preferably a carboxylic acid, more preferably a carboxylic acid with a very high solubility in water, such as a $C_4$–$C_{10}$ polycarboxylic acid, such as maleic acid, fumaric acid, adipic acid, and most preferably citric acid.

The invention further contemplates a composition comprising zero to about 10 weight percent of an emulsifying agent. Preferably, the emulsifying agent is a $C_6$–$C_{20}$ fatty acid mono- or di-glyceride or a mixture of glycerides. Several glyceryl mono- and di-esters are commercially available. Preferably, the emulsifying agent is a glyceryl mono- or di-ester of a $C_6$–$C_{17}$ carboxylic acid. Exemplary $C_6$–$C_{20}$ fatty acid mono- or di-glycerides include glyceryl citrate/lactate/linoleate/oleate (the ester of glycerin and a blend of citric, lactic, linoleic and oleic acids; Imwitor™ 375, Hüls America), glyceryl stearate (Mazol™ GMS-K, PPG Industries; Witconol™ MST, Witco), a mixture of distilled monoglycerides from sunflower oil (DMG™-130, Archer Daniels Midland Colo.), glyceryl distearate (Isolene™, Vevy), glyceryl dioleate (Kessco® Glycerol Dioleate, Stepan). Most preferably, the emulsifying agent is a stearic acid/glycerin mono-or di-ester.

A contemplated composition can also include a perfume ("fragrance") to help mask the odor of the components and a colorant. These inactive ingredients are present, if at all, in minor amounts that do not exceed about 5 weight percent in aggregate. Although such inactive ingredients can be present in any contemplated composition, they are not included in a recitation of a contemplated embodiment as they are inactive as solvents.

A preferred cleaning composition comprises about 55 to about 60 weight percent ethyl lactate and about 2 to about 5 weight percent methyl soyate. A particularly preferred cleaning composition is a high performance cleaning composition that further comprises about 15 to about 25 weight percent dibasic ester organic co-solvent, about 15 to about 25 weight percent branched alcohol ethoxylate surfactant, and about 1 weight percent citric acid acidulent. Such a particularly preferred composition further comprises zero to about 5 weight percent of an emulsifying agent. Exemplary particularly preferred cleaning compositions are described in the examples below.

Contemplated compositions are substantially miscible with water, unlike many petrochemical-based cleaning solvents. Water miscibility is advantageous, because it is easier to handle the cleaning solutions, dispose of them, dilute them and rinse them off of components. A biodegradable solution of the invention can be degraded in standard sewerage treatment plants, as opposed to special chemical waste handling procedures.

In one embodiment, a contemplated composition is substantially free of added water. Thus, although some water can be present as a result of being an impurity of a constituent, water is typically not added to a composition, and such a composition typically contains 5 weight percent water or less. The weight percent of the compositions described herein refers to the weight percent of the organic phase, and does not include the mass of any added water.

A contemplated composition discussed above can also be used as a concentrate, and as such, it can be admixed with up to about 30 weight percent water prior to use. In a preferred concentrate usage, a contemplated composition is admixed with water and emulsified prior to use.

A composition of the invention is a high performance printing press cleaning product, and as such, it is contemplated for use in cleaning printing presses, blankets and rollers either alone, or in conjunction with presently available cleaning systems.

A method of removing ink according to the invention comprising the steps of providing an ink removal solution, contacting a surface that has ink on it with the ink removal solution, and separating the used ink removal solution from the cleaned surface.

The ink removal solution comprises about 40 to about 70 weight percent of a $C_1$–$C_4$ ester of lactic acid and about 1 to about 30 weight percent $C_1$–$C_4$ ester of a $C_{16}$–$C_{20}$ fatty acid, as discussed above.

The contact with the ink removal solution is for a period of time sufficient to permit at least some of the ink to become dissolved or dispersed in the ink removal solution to form a used ink removal solution and a cleaned surface.

The contact can be with a flushing motion, so that the contact and removal steps might occur at about the same time. This is the case in some of the cleaning systems of the art, with which a composition of the invention is usefully employed.

That contact could also be with a rubbing motion, providing some friction to assist in ink removal. This is the case in some of the other cleaning systems of the art, with which a composition of the invention is usefully employed.

To clean blankets and rollers by hand, the part to be cleaned is first wiped with a cloth dampened (preferably wet liberally) with a cleaning composition the invention, then wiped dry.

For automatic blanket wash-up devices, it is best to use the solvent in the cleaning system as recommended by the system manufacturer.

For automatic roller wash-up devices, a cleaning solution of the invention is applied to the top roller and permitted to circulate throughout the entire system. Then a squeegee is used to remove the loosened ink.

To use a cleaning composition of the invention to assist in removal of dirt, grit and/or lint from the blanket, the blanket is flushed with a cleaning composition of the invention. optionally, the cleaning composition is first diluted up to 25 weight percent with water prior to flushing in order to enhance flushing action. Preferably, a diluted composition according to the invention is used within a matter of days of the dilution to minimize biodegradation.

A contemplated method of ink removal can also be employed in the recycling of printed paper, wherein the paper (shredded or pulp) is contacted with the ink removal solution, preferably with agitation, then the used ink removal solution is separated, preferably by compression of the wet paper or pulp.

The present invention is illustrated in the non-limiting examples that follow.

Example 1

Press, Blanket and Roller Wash Formulation A

| Weight Percent | Ingredient |
| --- | --- |
| 57 | Ethyl Lactate CAS No. 97-64-3 |
| 3 | Soy Methyl Ester (Methyl Soyate) CAS No. 67784-80-9 |
| 20 | Dibasic ester of mostly adipate (DuPont DBE ™-3) |
| 20 | Surfactant (branched alcohol ethoxylate, Surfonic ™ TDA-3B) |
| 0.06 | Citric acid, anhydrous |

The ingredients were mixed together until a homogeneous solution was formed.

Example 2

Press, Blanket and Roller Wash Formulation B

| Weight Percent | Ingredient |
| --- | --- |
| 57 | Ethyl Lactate CAS No. 97-64-3 |
| 3 | Soy Methyl Ester (Methyl Soyate) AS No. 67784-80-9 |
| 20 | Dibasic ester of mostly adipate (DuPont DBE ™-3) |
| 20 | Surfactant (branched alcohol ethoxylate, Surfonic ™ TDA-3B) |
| 0.06 | Citric acid, anhydrous |
| 5 | Emulsifier (glyceride, DMG-130) |

The ingredients were mixed together until a homogeneous solution was formed.

Example 3

Press, Blanket and Roller Wash Cleaning

The cleaning compositions of the above examples were used on several newspaper printers, offset printers, and ink jet office printers. Both formulations cleaned better than the corresponding petroleum based cleaners, even removing old, dried and caked ink that the petrochemical cleaners had left. In many cases, ⅓ to ⅔ less volume of the present formulation was needed than the corresponding petrochemical cleaners. The cleaned components dried well, without leaving a film. In some cases, the cleaning solution was rinsed off with water. There was no noticeable corrosion of the rollers using the compositions of the invention.

Cleaning compositions containing ethyl lactate but no $_1$–$C_4$ ester of a $C_{16}$–$C_{20}$ fatty acid were not as effective at removing the ink as the compositions of Examples 1 and 2.

From the foregoing, it will be observed that numerous modifications and variations can be effectuated without departing from the true spirit and scope of the novel concepts of the present invention. It is to be understood that no limitation with respect to the specific examples presented is intended or should be inferred. The disclosure is intended to cover by the appended claims all such modifications as fall within the scope of the claims.

What is claimed is:

1. A cleaning composition comprising:

(A) about 40 to about 70 weight percent of a $C_1$–$C_4$ ester of lactic acid; and (B) about 1 to about 30 weight percent $C_1$–$C_4$ ester of a $C_{16}$–$C_{20}$ fatty acid having a melting point of –10° C. or less.

2. The composition according to claim 1 wherein said $C_1$–$C_4$ ester of lactic acid is present at about 50 to about 60 weight percent.

3. The composition according to claim 1 wherein said $C_1$–$C_4$ ester of a $C_{16}$–$C_{20}$ fatty acid is present at about 2 to about 10 weight percent.

4. A cleaning composition comprising:

(A) about 40 to about 70 weight percent of a $C_1$–$C_4$ ester of lactic acid;

(B) about 1 to about 30 weight percent $C_1$–$C_4$ ester of a $C_{16}$–$C_{20}$ fatty acid having a melting point of –10° C. or less;

(C) about 10 to about 30 weight percent of an organic co-solvent;

(D) about 10 to about 30 weight percent of a surfactant;

(E) zero to about 5 weight percent of an acidulent;

(F) zero to about 10 weight percent of an emulsifying agent; and (G) zero to about 5 weight percent of a fragrance.

5. The composition according to claim 4 wherein said $C_1$–$C_4$ ester of lactic acid is present at about 50 to about 60 weight percent.

6. The composition according to claim 4 wherein said $C_1$–$C_4$ ester of a $C_{16}$–$C_{20}$ fatty acid is present at about 2 to about 10 weight percent.

7. The composition according to claim 4 wherein said organic co-solvent is present at about 15 to about 25 weight percent.

8. The composition according to claim 4 wherein said surfactant is present at about 15 to about 25 weight percent.

9. The composition according to claim 4 wherein said organic co-solvent is a $C_1$–$C_4$ ester of a $C_3$–$C_{10}$ dicarboxylic acid, tetrahydrofurfuryl alcohol, or a mixture of a di-$C_2$–$C_3$ alkylene glycol and di-$C_1$–$C_6$ alkyl ether.

10. The composition according to claim 4 wherein said $C_1$–$C_4$ ester of lactic acid is ethyl lactate.

11. The composition according to claim 4 wherein said $C_1$–$C_4$ ester of a $C_{16}$–$C_{20}$ fatty acid is comprised of a mixture whose fatty acids are constituted by about 70 to about 90 percent unsaturated fatty acids.

12. The composition according to claim 11 wherein said fatty acid $C_1$–$C_4$ ester is a methyl ester.

13. The composition according to claim 12 wherein said fatty acid methyl ester is a methyl ester of fatty acids from an edible oil.

14. The composition according to claim 13 wherein said fatty acid methyl ester is methyl soyate.

15. The composition according to claim 4 wherein said surfactant is a mixture of surfactant molecules.

16. The composition according to claim 4 admixed with up to about 30 weight percent water as an emulsion.

17. A method of removing ink comprising the steps of:
  (a) providing an ink removal solution comprising:
    (i) about 40 to about 70 weight percent of a $C_1$–$C_4$ ester of lactic acid; and
    (ii) about 1 to about 30 weight percent $C_1$–$C_4$ ester of a $C_{16}$–$C_{20}$ fatty acid having a melting point of −10° C. or less;
  (b) contacting a surface that has ink on it with the ink removal solution for a period of time sufficient to permit at least some of the ink to become dissolved or dispersed in the ink removal solution to form a used ink removal solution and a cleaned surface; and
  (c) separating the used ink removal solution from the cleaned surface.

18. The method of removing ink according to claim 17 wherein the contacting step (b) is with a flushing motion.

19. The method of removing ink according to claim 17 wherein the contacting step (b) is with a rubbing motion.

* * * * *

UNITED STATES PATENT AND TRADEMARK OFFICE
CERTIFICATE OF CORRECTION

PATENT NO. : 6,284,720 B1
DATED : September 4, 2001
INVENTOR(S) : James E. Opre

It is certified that error appears in the above-identified patent and that said Letters Patent is hereby corrected as shown below:

<u>Title page,</u>
Item [22] filing date should be -- Mar. 31, 2000 --.

Signed and Sealed this

Fourteenth Day of May, 2002

Attest:

JAMES E. ROGAN
Attesting Officer     Director of the United States Patent and Trademark Office